(12) United States Patent
Narumi et al.

(10) Patent No.: US 12,183,101 B2
(45) Date of Patent: Dec. 31, 2024

(54) IMAGE PROCESSING SYSTEM, IMAGE PROCESSING METHOD, AND STORAGE MEDIUM

(71) Applicant: CANON KABUSHIKI KAISHA, Tokyo (JP)

(72) Inventors: Yuki Narumi, Kanagawa (JP); Go Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 17/716,084

(22) Filed: Apr. 8, 2022

(65) Prior Publication Data

US 2022/0335738 A1 Oct. 20, 2022

(30) Foreign Application Priority Data

Apr. 12, 2021 (JP) .................................. 2021-067356

(51) Int. Cl.
| | | |
|---|---|---|
| *G06V 30/146* | (2022.01) | |
| *G06V 10/82* | (2022.01) | |
| *G06V 30/148* | (2022.01) | |
| *G06V 30/18* | (2022.01) | |
| *G06V 30/19* | (2022.01) | |
| *G06V 30/22* | (2022.01) | |

(52) U.S. Cl.
CPC .......... *G06V 30/1463* (2022.01); *G06V 10/82* (2022.01); *G06V 30/148* (2022.01); *G06V 30/1801* (2022.01); *G06V 30/19147* (2022.01); *G06V 30/22* (2022.01)

(58) Field of Classification Search
CPC ...................................................... G06V 10/82
See application file for complete search history.

(56) References Cited

U.S. PATENT DOCUMENTS

| | | | |
|---|---|---|---|
| 5,187,753 A | 2/1993 | Bloomberg et al. | |
| 5,355,420 A | 10/1994 | Bloomberg et al. | |
| 2006/0062459 A1* | 3/2006 | Saito | G06V 30/413 |
| | | | 382/181 |
| 2008/0226196 A1* | 9/2008 | Kojima | G06V 10/243 |
| | | | 382/289 |
| 2012/0127536 A1* | 5/2012 | Lin | H04N 1/00761 |
| | | | 358/3.26 |
| 2018/0108354 A1* | 4/2018 | Negi | G10L 15/1815 |
| 2019/0311227 A1* | 10/2019 | Kriegman | G06V 30/19173 |
| 2020/0106918 A1 | 4/2020 | Nakamura | |
| 2021/0073566 A1* | 3/2021 | Hoehne | G06T 7/10 |
| 2021/0209354 A1* | 7/2021 | Abekawa | G06V 30/416 |
| 2022/0335738 A1* | 10/2022 | Narumi | G06V 30/226 |

FOREIGN PATENT DOCUMENTS

| | | |
|---|---|---|
| JP | H03-268189 A | 11/1991 |
| JP | H08-44822 A | 2/1996 |
| JP | 2020-053931 A | 4/2020 |

\* cited by examiner

*Primary Examiner* — Edward Park
(74) *Attorney, Agent, or Firm* — Venable LLP

(57) ABSTRACT

An image processing system performs tilt correction with respect to a document image having handwritten characters and typed letters mixed with each other. The image processing system separates the document image into an image with handwritten characters determined as handwritten characters and an image without handwritten characters not determined as handwritten characters, estimates a tilt angle of the image without handwritten characters, and corrects the document image on the basis of the tilt angle.

7 Claims, 5 Drawing Sheets

FIG. 3

IMAGE PROCESSING SYSTEM, IMAGE PROCESSING METHOD, AND STORAGE MEDIUM

BACKGROUND OF THE INVENTION

Field of the Invention

The present invention relates to an image processing system, an image processing method, and a program related to a technology of performing tilt correction with respect to a document image having handwritten characters and typed letters mixed with each other.

Description of the Related Art

In the related art, there is a technology of extracting character strings within image data as digital data by perfuming optical character recognition processing (which will hereinafter be referred to as OCR processing) with respect to document image data scanned by an image forming device. However, if a scanned document image has tilted, correct OCR processing may not be able to be performed. Hence, regarding preprocessing of OCR processing, there is a technology of estimating a tilt angle of a document image and performing correction for a correct angle (hereinafter, tilt correction) (for example, Japanese Patent Laid-Open No. H3-268189, Japanese Patent Laid-Open No. H8-44822, and Japanese Patent Laid-Open No. 2020-53931).

In the technology described in Japanese Patent Laid-Open No. H3-268189, a variance of pixels is measured as a function of a rotation angle of a document image, and tilt correction is performed based on a document rotation angle (a tilt angle) having the largest variance. In addition, in the technology described in Japanese Patent Laid-Open No. H8-44822, after a table region is detected, tilt correction of an input image is performed on the basis of a tilt of a ruled line. In addition, in the technology described in Japanese Patent Laid-Open No. 2020-53931, tilt correction is performed without checking the content of a document image by detecting an edge of the document image.

However, in Japanese Patent Laid-Open No. H3-268189, if many handwritten characters having an uneven line spacing, pitch, and angles are mixed together, it is difficult to estimate an accurate tilt angle. Particularly, if the proportion of the number of handwritten characters is high with respect to that of typed letters, or if the density of handwritten characters is high (the brightness difference between handwritten characters and typed letters is large), there is concern that an accurate tilt angle may not be able to be estimated. In addition, in Japanese Patent Laid-Open No. H8-44822, if there is no ruled line information in a manuscript image, there is concern that tilt correction may not be able to be performed. In addition, in Japanese Patent Laid-Open No. 2020-53931, if an edge cannot be detected, or if a document manuscript is not rectangular (or it has a tear or the like), there is concern that accurate tilt correction may not be able to be performed.

SUMMARY OF THE INVENTION

According to the present disclosure, there is provided an image processing system which performs tilt correction with respect to a document image having handwritten characters and typed letters mixed with each other, the image processing system comprising: a memory that stores instructions; and a processor that executes the instructions to perform: obtaining a document image, separating the document image into an image with handwritten characters and an image without handwritten characters, estimating a tilt angle of the image without handwritten characters, and correcting the document image on the basis of the tilt angle.

Further features of the present invention will become apparent from the following description of exemplary embodiments (with reference to the attached drawings).

BRIEF DESCRIPTION OF THE DRAWINGS

FIG. 3 is a view illustrating an example of a document image and processing results according to the first embodiment.

DESCRIPTION OF THE EMBODIMENTS

Hereinafter, embodiments of the present invention will be described in detail with reference to the accompanying drawings. The following embodiments do not limit the present invention according to the claims. In addition, not all the combinations of features described in the present embodiment are essential for the solution of the present invention. The same reference numbers are applied to the same constituent elements, and description thereof will be omitted.

<Overview of Image Formation System>

Figure 1:
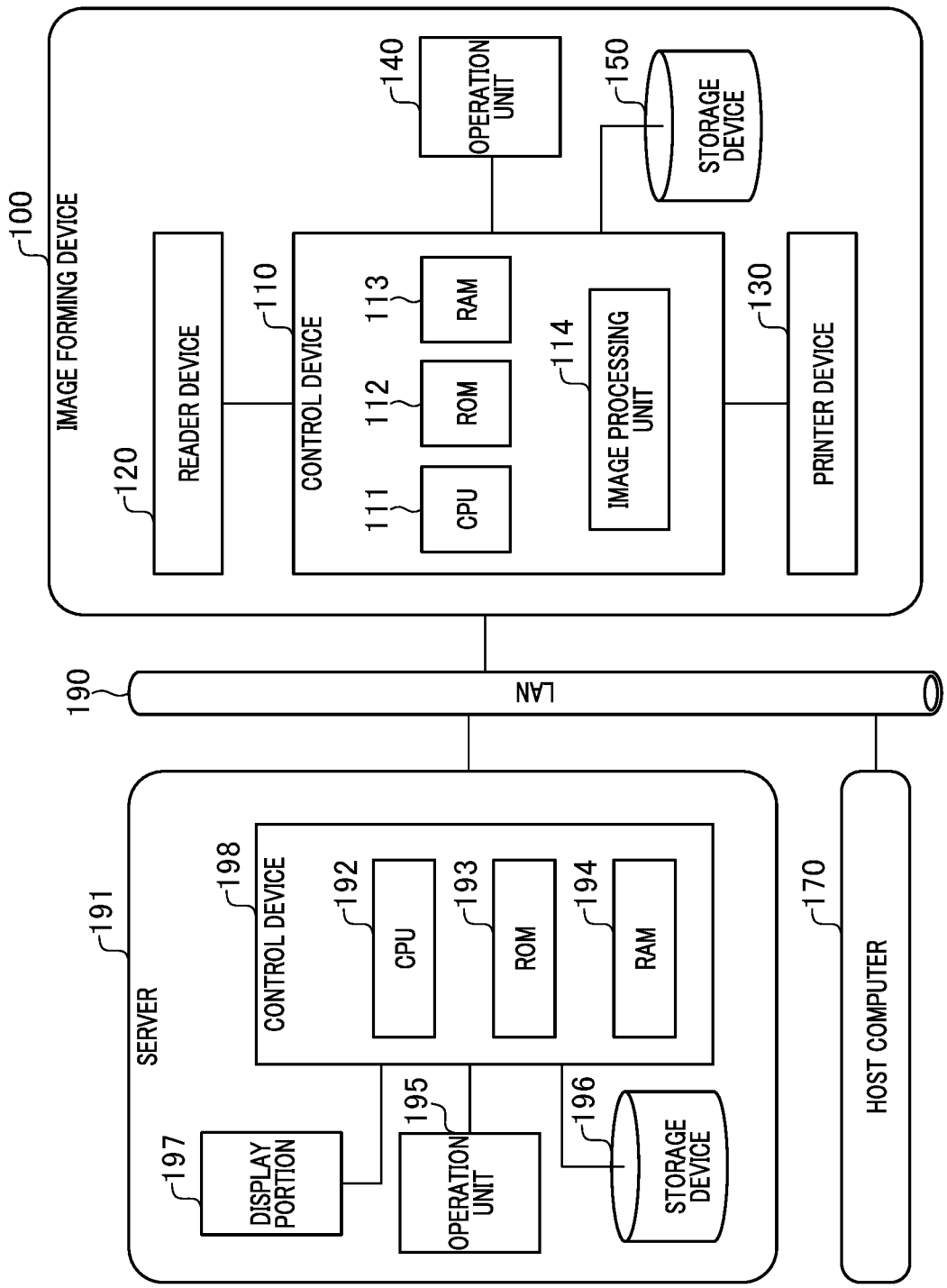
FIG. 1 is a block diagram illustrating an example of an image processing system according to an embodiment of the present invention.

FIG. 1 is a block diagram illustrating an example of an image processing system according to an embodiment of the present invention. As illustrated in FIG. 1, the image processing system includes an image forming device 100, a host computer 170, and a server 191 (a cloud server may be adopted).

In the present embodiment, description will be given on assumption that a multi-function printer (MFP) in which a plurality of functions such as a printing function, a reading function, and a FAX function are integrated is used as the image forming device 100. In addition, the server 191 will be described such that it has a document management function. The image forming device 100, the host computer 170, and the server 191 are connected to a network such as a local area network (LAN) 190 such that they can communicate with each other. A plurality of image forming devices 100, host computers 170, and servers 191 may be connected thereto, and other devices may be connected thereto. In addition, in the present embodiment, the LAN 190 will be described as an example of a network, but a cable network, a radio network, or a constitution in which these are combined may be adopted.

The image forming device 100 includes a control device 110, a reader device 120, a printer device 130, an operation unit 140, and a storage device 150. The control device 110 is connected to each of the reader device 120, the printer device 130, the operation unit 140, and the storage device 150.

The control device 110 is a control board (a controller) which generally controls the image forming device 100. The control device 110 includes a CPU 111, a ROM 112, a RAM 113, and an image processing unit 114.

The CPU 111 controls each of the blocks inside the control device 110 via a system bus (not illustrated). For example, the CPU 111 causes the image forming device 100 to execute a function by reading and executing a program stored in the ROM 112, the RAM 113, the storage device 150, or other storage mediums.

For example, the ROM 112 stores a control program and tables, setting data, and the like required for executing the function of the image forming device 100. For example, the RAM 113 is used as a work memory of the CPU 111.

The image processing unit 114 executes various kinds of image processing such as converting, correcting, editing, zipping/unzipping, and the like with respect to read image data generated by the reader device 120 or image data received from the outside. The image processing unit 114 may be constituted of hardware or may be realized by software.

The reader device 120 has a constitution of a scanner engine, thereby performing manuscript scanning processing in which a manuscript is optically read and generating read image data (a document image) from an optically read manuscript. The manuscript scanning processing may be performed by a method of optically reading a manuscript set on a manuscript stand or may be performed by a method of optically reading a manuscript fed from an automatic document feeder (ADF).

The printer device 130 has a constitution of a printer engine coping with various recording types such as an ink jet recording type and an electrophotographic type. Accordingly, the printer device 130 forms an image in a recording medium.

The operation unit 140 includes operation keys for receiving an operation of a user and a liquid crystal panel for performing various kinds of setting, display of a user interface screen, and the like. The operation unit 140 outputs information received through a user's operation or the like to the control device 110.

The storage device 150 stores user information. Examples of user information include image data, equipment information such as a mode or a license, an address book, and customized information.

The image forming device 100 is not limited to the constitution illustrated in FIG. 1 and includes other constitutions in accordance with the function which can be executed by the image forming device 100. For example, it may have a constitution required for executing a FAX function or a constitution enabling short-range radio communication.

The server 191 includes a control device 198, an operation unit 195, a storage device 196, and a display portion 197. The control device 198 is connected to each of the operation unit 195, the storage device 196, and the display portion 197.

The control device 198 is a control board (a controller) which generally controls the server 191. The control device 198 includes a CPU 192, a ROM 193, and a RAM 194.

The CPU 192 controls each of the blocks inside the control device 198 via a system bus (not illustrated). For example, the CPU 192 causes the server 191 to execute the function by reading and executing a program stored in the ROM 193, the RAM 194, the storage device 196, or other storage mediums.

For example, the ROM 193 stores various control programs such as an operating system program (OS), and tables, setting data, and the like required for executing the function of the server 191. For example, the RAM 194 is used as a work memory of the CPU 192.

The operation unit 195 includes a keyboard, a pointing device, and the like for receiving an operation of a user and outputs information of a received user's operation and the like to the control device 198. For example, the storage device 196 stores various application programs, data, user information, equipment information, and the like. For example, the display portion 197 is a liquid crystal display and performs display of various user interface screens and information.

The host computer 170 is connected to each of the image forming device 100 and the server 191 via the LAN 190. Due to this constitution, the image forming device 100 and the server 191 can also be operated on the basis of an operation or an instruction from the host computer 170.

With an image processing system having the constitution described above as an example, specific embodiments will be described below. The term "handwritten characters" used in the following embodiments indicates characters which are handwritten and input by a human hand.

First Embodiment

In a case of document in which handwritten characters and typed letters are mixed with each other, there is a likelihood that tilt correction in the related art will fail due to an influence of handwritten characters of which the spacing and the pitch of characters are uneven. In the present embodiment, if there are handwritten characters, tilt angle estimation is performed by generating an image for estimating a tilt angle in which an influence of handwritten characters is eliminated.

Figure 2:
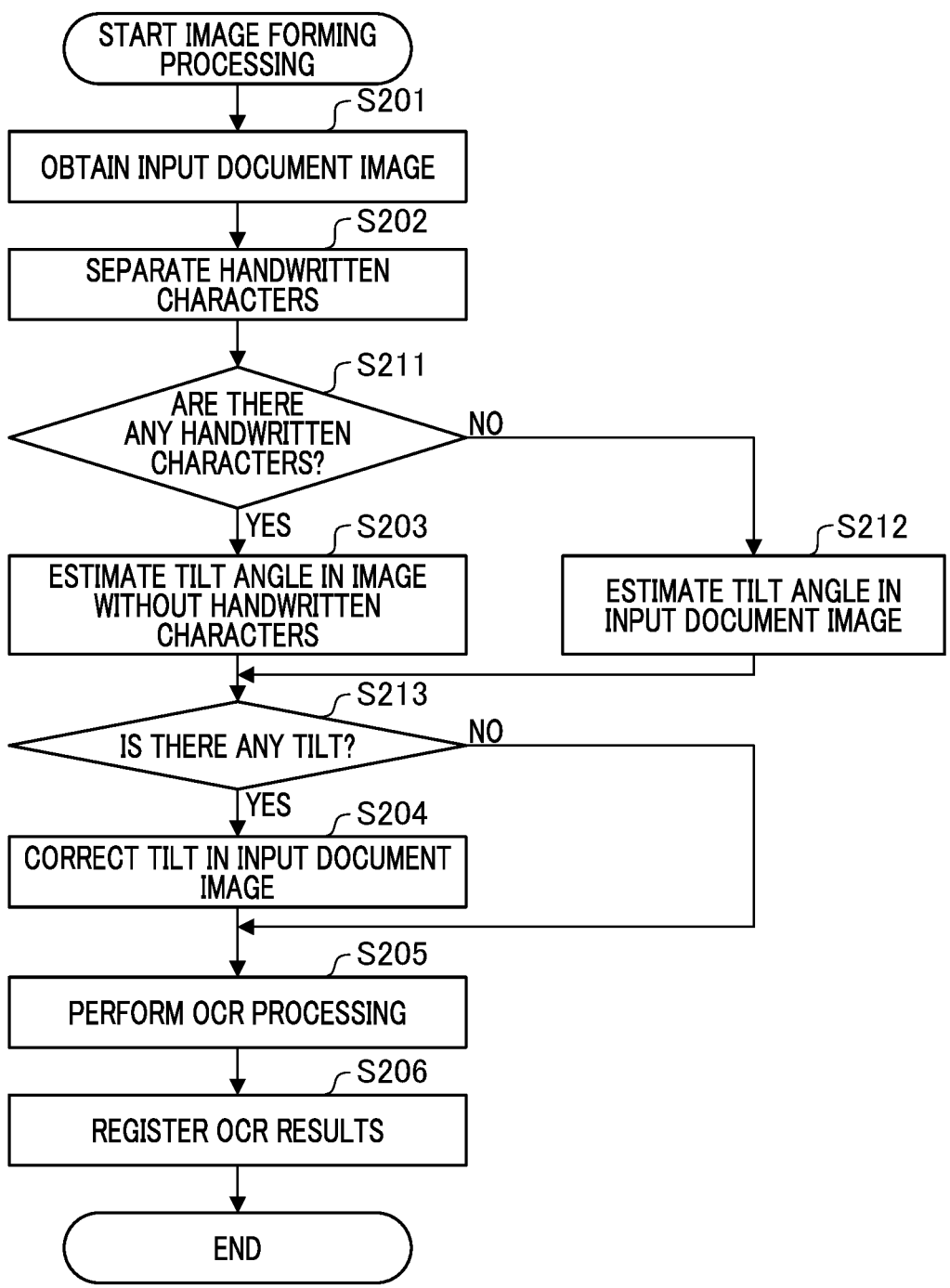
FIG. 2 is a flowchart showing a procedure of image processing according to a first embodiment.
Figure 3:
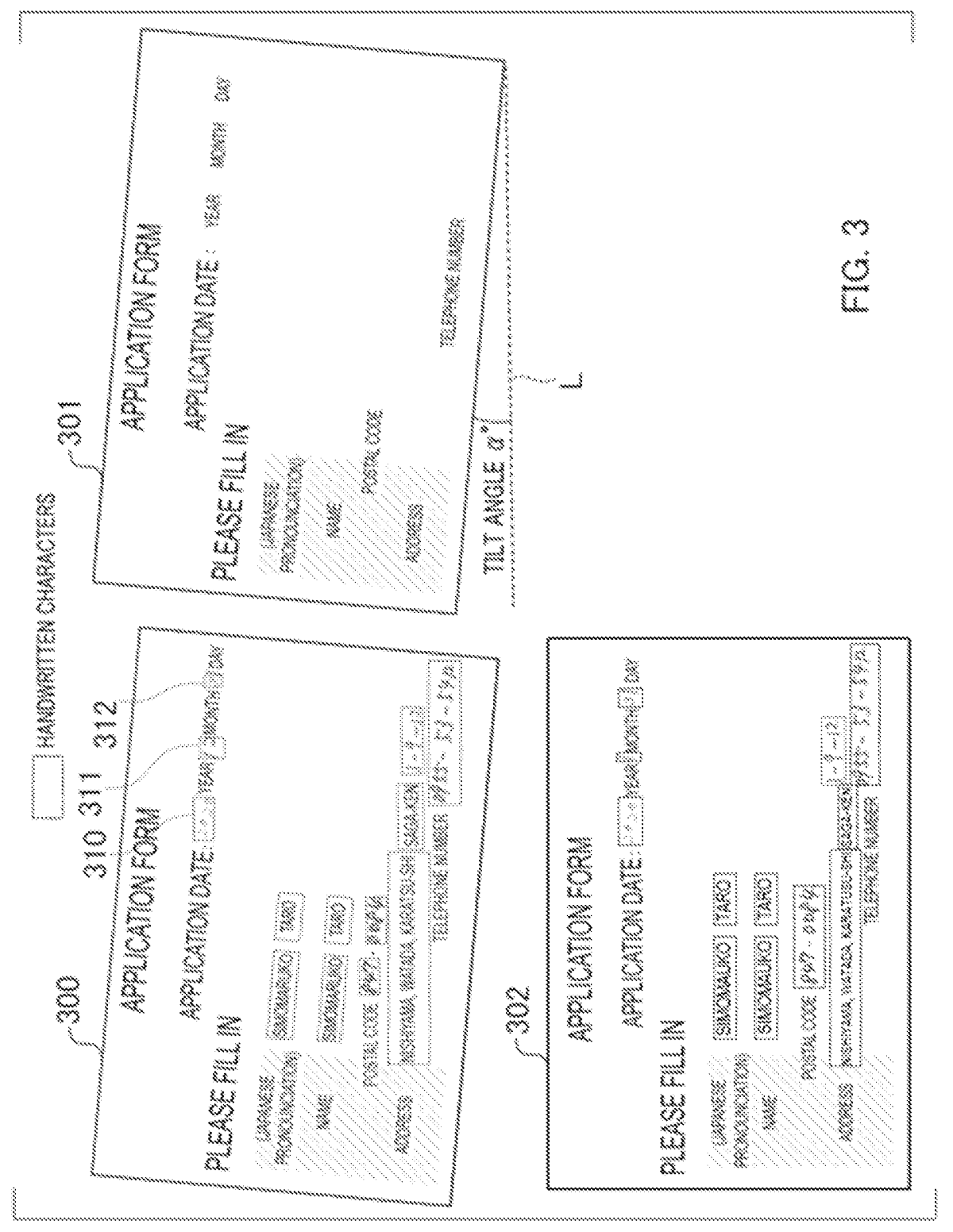

FIG. 2 is a flowchart showing a procedure of image processing according to a first embodiment. FIG. 3 is a view illustrating an example of an input document image and processing results according to the first embodiment. In the following description, the term "tilt" denotes a tilt angle of an input document image with respect to a reference line L (refer to FIG. 3) extending in a lateral direction which serves as a reference for the tilt.

Hereinafter, the procedure of image processing will be described using FIG. 2, but as necessary, the procedure of image processing will be described with reference to FIG. 3. For example, the processing in FIG. 2 is realized when the CPU 111 causes a program stored in the ROM 112 to be read and executed in the RAM 113.

In Step S201, processing of obtaining an input document image is performed. An input document image is a document image 300 input to the image processing system. In the processing of obtaining an input document image, when an instruction for manuscript scanning processing from a user is received via the operation unit 140, the CPU 111 instructs the reader device 120 to perform scanning, and thus scanning is performed. Accordingly, read image data corresponding to a manuscript (a document image) is obtained. The document image 300 illustrated in FIG. 3 is an example of an input document image obtained through document image obtaining processing of Step S201. If a manuscript is obliquely set on the manuscript stand, a tilt also occurs in the document image 300 obtained by the reader device 120. In addition, even if a manuscript is read using an ADF, a tilt may also occur in an obtained document image due to the way of setting of the manuscript, the difference between speeds on the left and right sides of a conveyance motor, or the like. For this reason, there is a need to identify the tilt of an obtained document image and perform correction. In this manner, in the image processing system, the CPU 111 functions as a document image obtaining portion which obtains document images.

In Step S202, handwritten character separation processing is performed. In the processing of separating handwritten characters, the CPU 111 performs processing of separating locations where handwritten characters are written with respect to the read image data generated in Step S201. Accordingly, an image with handwritten characters and an image without handwritten characters are generated. The image without handwritten characters generated herein is used for tilt angle estimation after this separation processing. In this manner, in the image processing system, the CPU 111 functions as a handwritten character separation portion which separates an image into an image with handwritten characters determined as handwritten characters and an image without handwritten characters not determined as handwritten characters.

In the technique for separation of handwritten characters according to the present embodiment, first, handwritten character regions within the image and a background region excluding those are subjected to learning in a neural network (NN). Next, on the basis of the learning in the neural network, it is determined whether each pixel is handwriting or not handwriting. Accordingly, if the characteristics of the pixel coincide with those of an image of handwritten characters, the pixel is determined as handwritten characters and the pixel can be extracted. For example, pixels such as pixels 310 to 312 are determined as handwritten characters by performing this processing with respect to the read image data of the document image 300 in FIG. 3. Next, a document image 301 without handwritten characters is obtained by eliminating the pixels 310 to 312 which have been determined as handwritten characters. The technique for separating handwritten characters according to the present embodiment is an example, and the technique for separating handwritten characters is not limited to the technique according to the present embodiment.

Separation of handwritten characters in the related art is performed for the purpose of being subjected to OCR processing specialized for each kind of characters. OCR processing denotes processing of extracting character data through optical character recognition (OCR).

In contrast, in the present embodiment, handwritten characters are separated such that tilt recognition is not hindered. Namely, an image used in the following tilt angle estimation is generated by excluding handwritten characters through this separation processing. It is possible to expect that the accuracy of estimating a tilt angle is improved by using an image in which handwritten characters are excluded, such as the document image 301 without handwritten characters.

In Step S211, the CPU 111 determines whether handwritten characters are mixed in the read document image 300. In Step S202, if the number of pixels which can be extracted as handwritten characters is equal to or larger than a certain amount, it is determined that there are handwritten characters (Yes), and the processing proceeds to Step S202. On the other hand, in Step S202, if the number of pixels which can be extracted as handwritten characters falls below a certain amount, it is determined that there are no handwritten characters (No), and the processing proceeds to Step S212.

In the present embodiment, in determining in Step S211 whether or not there are handwritten characters, the presence or absence of handwritten characters has been determined on the basis of the proportion of the pixels of the image with handwritten characters and the pixels of the image without handwritten characters in the image separated in Step S202. If the number of pixels which have been extracted as handwritten characters falls below a certain amount, there is a high likelihood that image noise or the like will occur, and there is almost no influence on tilt angle estimation. Alternatively, even if handwritten characters are truly extracted, when the proportion of the pixels without handwritten characters, such as typed letters, thereto is equal to or higher than a certain level, there is almost no influence on tilt angle estimation. Therefore, when the presence or absence of handwritten characters is determined, determination of the presence of handwritten characters (Yes) has been performed if the proportion of the pixels of the image with handwritten characters in the image separated in Step S202 is larger than that of the pixels of the image without handwritten characters by a certain level or higher.

In Step S203, tilt angle estimation processing is performed. In the tilt angle estimation processing, the CPU 111 performs tilt angle estimation using the document image 301 without handwritten characters generated in Step S202. Accuracy of tilt angle estimation is improved by excluding handwritten characters having uneven line spacing, pitches, and angles and performing tilt angle estimation using the document image 301 without handwritten characters. In this manner, the CPU 111 functions as a tilt angle estimation portion which estimates the tilt angle of an image without handwritten characters in the image processing system.

A technique for estimating a tilt angle (a rotation angle) used in the present embodiment utilizes character strings within a document image or arrangement in the horizontal direction in data before lines are imprinted. For example, the tilt angle can be estimated by taking projection histograms in diverse directions and selecting an angle corresponding to a histogram in which a peak and a bottom of the histogram significantly oscillates in a short cycle. This is because horizontal lines such as character string in the same line or ruled lines in the same direction are voted for the same bin on the histogram, nothing is voted for parts corresponding to areas between lines in a case of projection in a correct direction, and therefore a significant amplitude is generated in a cycle of spacing between characters.

Regarding the angles estimated by the technique described so far, directions of characters have not been taken into consideration, and uncertainty of 180 degrees is present. The directions of characters can be judged using probability information of characters when simple character recognition processing is performed. Accordingly, angle information can be calculated in consideration of the directions of characters as well. This technique for tilt angle estimation is a technique effective in document mainly with typed letters or ruled lines in which the line spacing is uniform, the intervals between lines are equal to or larger than predetermined intervals, and a traverse stroke becomes horizontal. Therefore, in typed letter-based document such as the document image 301 without handwritten characters, the tilt angle can be accurately determined. The horizontal direction described above denotes a direction parallel to the reference line L in FIG. 3. The reference line L is a line extending in the lateral direction on the surface of this sheet and is a line orthogonal to the vertical direction on the surface of this sheet.

In the present embodiment, a tilt angle α with respect to the reference line L can be obtained by performing tilt angle estimation processing with respect to the document image 301 without handwritten characters. However, a technique for identifying a tilt angle of an image is not limited to any particular technique.

In Step S212, the CPU 111 performs tilt angle estimation processing with respect to a document image determined in Step S211 that there are no handwritten characters. Tilt angle estimation processing is similar to the processing performed in Step S203.

In Step S213, on the basis of the tilt angle estimated in Step S203 and Step S212, it is determined whether there is a tilt in the document image. If the tilt angle is equal to or larger than a certain angle, it is determined that there is a tilt (Yes), and the processing proceeds to the tilt correction processing of Step S204. On the other hand, if the tilt angle does not reach a certain angle, it is determined that there is no tilt (No), and the processing skips tilt correction and proceeds to the OCR processing of Step S205.

In Step S204, the CPU 111 performs the tilt correction processing with respect to the document image obtained in S201 using the tilt angle estimated in Step S203 or Step S212. In the tilt correction according to the present embodiment, rotation coordinate conversion is performed based on the tilt angle estimated in Step S203 and Step S212. A unit configured to perform correction is not limited thereto. In the present embodiment, a corrected image 302 after tilt correction can be obtained by performing this tilt correction processing with respect to the document image 301 without handwritten characters using the tilt angle α illustrated in FIG. 3. After the tilt correction processing, the processing proceeds to the OCR processing of Step S205. In this manner, in the image processing system, the CPU 111 functions as a tilt correction portion which corrects the document image 300 on the basis of the tilt angle α.

In Step S205, the CPU 111 performs the OCR processing with respect to the corrected image 302 corrected in Step S204. In the present embodiment, the OCR processing specialized for handwriting and typed letters is performed with respect to each of handwritten characters separated in Step S202 and the document image 301 without handwritten characters. Thereafter, processing of merging the OCR results of the handwritten characters and the OCR results of the document image 301 without handwritten characters is performed.

In addition, in the present embodiment, a character code of the character strings in the character string region is obtained by judging the character string region before the OCR processing and performing the OCR processing with respect to each region which has become the character string region. Through this judgement of regions, there is no need to perform processing for regions other than the character string region. As a result, reduction in processing load and accuracy of character recognition can be improved. Regarding the OCR processing, diverse techniques have been devised, and it is not limited to the technique according to the present embodiment.

In Step S206, the CPU 111 registers data obtained by adding text information obtained in Step S205 to the document image 300 or the corrected image 302 as in the storage device 150 and ends this processing. When data is registered, a document image may be converted into a document format such as a PDF which can be searched for in full text using the OCR processing results instead of the image data as it stands.

In the present embodiment, all the processing has been performed in the image forming device 100, but it is not limited thereto. For example, in order to disperse the processing load, the read image data generated in Step S201 via the LAN 190 may be transmitted to the server 191 and processing other than operations received from a user through the server 191 may be performed.

Second Embodiment

Figure 4:
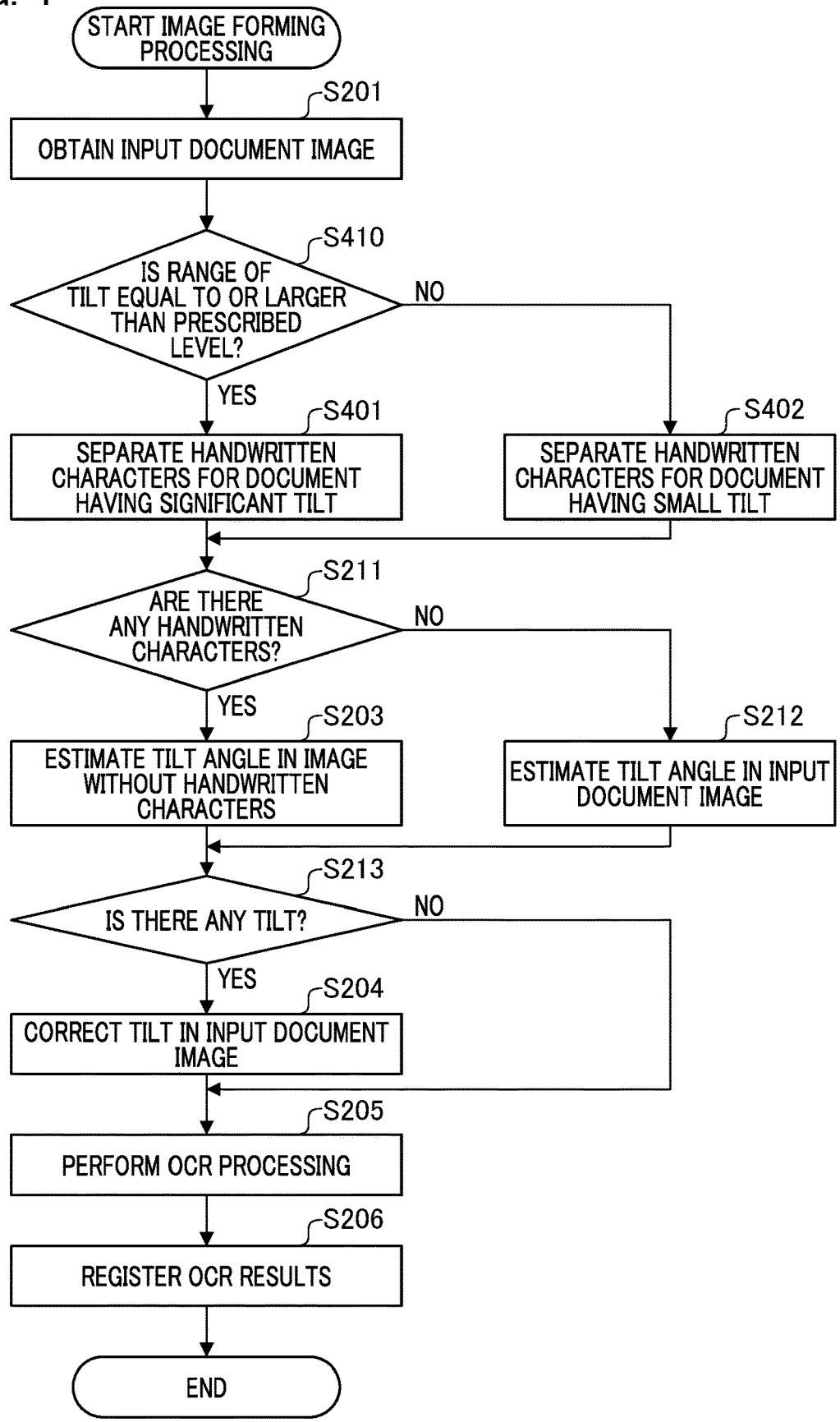
FIG. 4 is a flowchart showing a procedure of image processing according to a second embodiment.

In the present embodiment, in processing (processing of Step S202 in FIG. 2) of separating handwritten characters according to the first embodiment, a technique capable of maintaining high accuracy of separating handwritten characters with respect to a document image having a significant tilt will be described. Processing of maintaining accuracy of separating handwritten characters is executed with respect to a document image having a significant tilt, and simple processing only to the extent that sufficient accuracy can be exhibited is executed with respect to a document image having a small tilt. FIG. 4 is a flowchart showing a procedure of image processing according to the second embodiment. Hereinafter, regarding the second embodiment, points different from those of the first embodiment will be mainly described.

In Step S410, the CPU 111 determines a range of a tilt of the document image obtained in Step S201. A range of a tilt indicates a likelihood of the extent of a tilt of an input image or the range of the extent of an allowable tilt. For example, since a document image obtained by being set on a manuscript stand has a higher degree of freedom in way of placement than a document image obtained by the ADF, it is possible to mention that the range of a tilt is significant. In addition, even in the case of the ADF, there is a likelihood that a tilt will occur in a document image due to the way of setting a manuscript, the difference between speeds on the left and right sides of a conveyance motor, or the like. Particularly, if an ADF capable of coping with multi-sized manuscripts is utilized, the range of a tilt becomes significant compared to the case of utilizing the ADF for coping with a particular manuscript size. In this manner, in the image processing system, the CPU 111 functions as a tilt angle range determination portion which determines a range allowed for the tilt angle.

For example, the ADF in the image forming device 100 used in the present embodiment automatically detects the manuscript size such as a small size (a post card, a receipt, or the like). If this detected manuscript size is smaller than the largest manuscript size which can be fed, the manuscript is likely to tilt due to deviation of a setting position or the like. In this case, it is determined that the range of a tilt is equal to or larger than a prescribed level (Yes). In addition, even if a manuscript is obtained by being read from the manuscript stand, it is determined that the range of a tilt is equal to or larger than a prescribed level (Yes). In contrast, if the manuscript size detected by the ADF corresponds to the largest manuscript size which can be fed, it is determined that the range of a tilt is small and falls below a prescribed level (No). In this manner, in Step S410, if a likelihood of a tilt of a document image is significant and the range of a tilt is equal to or larger than a prescribed level (Yes), the processing proceeds to Step S401. On the other hand, if the range of a tilt falls below a prescribed level (No), the processing proceeds to Step S402.

The technique for separating handwritten characters used in the present embodiment is a technique in which handwritten character regions and the background region other than those within an image are subjected to learning in the neural network (NN) and it is determined whether or not it is handwriting for each pixel. Hereinafter, description will be distinctively given depending on whether or not the range of the tilt angle of an input document image is equal to or larger than a prescribed level.

Figure 5:
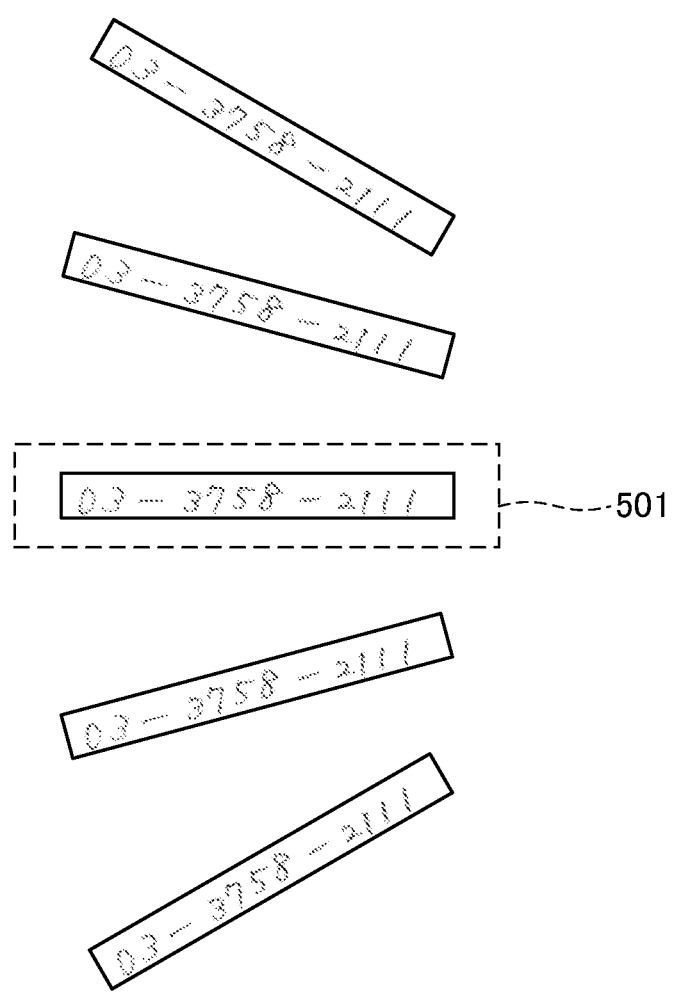
FIG. 5 is a view illustrating an example of learning data for separation of handwritten characters according to the second embodiment.

In Step S401, since the range of the tilt angle of the document image input in Step S410 has been determined to be equal to or larger than a prescribed level, the CPU 111 performs processing of separating handwritten characters for document having a significant tilt angle which can cope with this range. In the neural network used in the processing of Step S401, images having a plurality of patterns with a different tilt angle of handwritten characters are subjected to learning as the image data of handwritten characters. FIG. 5 is a view illustrating an example of learning data for separation of handwritten characters according to the second embodiment. As illustrated in FIG. 5, accuracy of extracting handwritten characters can be maintained with respect to an input document image having a significant tilt angle by causing handwritten characters to be subjected to learning at diverse angles.

In the present embodiment, the tilt angle of handwritten characters is varied, but it is not limited thereto. For example, an allowable tilt angle may be covered by limiting the range of the tilt angle of a learning image in the neural network and extracting handwritten characters while causing the tilt angle of an input document image to vary in this processing.

In Step S402, since the range of a tilt of the document image input in Step S410 has been determined to fall below a prescribed level, the CPU 111 performs processing of separating handwritten characters for document having a small tilt which can cope with this range. In the neural network used in the processing of Step S402, images having fewer rotation patterns than in the neural network used in the processing of Step S401 are subjected to learning as the image data for separation of handwritten characters. When the neural network having a simple network structure with fewer learning patterns is utilized, if the same accuracy is aimed, costs for reasoning can be reduced. For this reason, if it is considered that the range of the tilt is small, a simple network structure in which sufficient accuracy can be expected is used. In the neural network used in this processing, as indicated in an image 501 of FIG. 5, only an image in a normal direction is used for learning.

In this manner, in the present embodiment, the processing of separating handwritten characters is performed using a neural network subjected to learning of a plurality of patterns of rotated handwritten characters with respect to a document image having a significant range of a tilt. For this reason, high accuracy of separating handwritten characters can be maintained. In addition, the processing of separating handwritten characters is performed with respect to a document image having a small range of a tilt using a neural network in which the learning patterns are reduced. For this reason, sufficient accuracy can be exhibited by simple processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-067356, filed Apr. 12, 2021, which is hereby incorporated by reference herein in its entirety.

What is claimed is:

1. An image processing system which performs tilt correction with respect to a document image, the image processing system comprising:
   at least one memory that stores instructions; and
   at least one processor that executes the instructions to perform:
   (1) obtaining the document image, wherein the document image includes handwritten characters and typed letters;
   (2) generating a first image containing no handwritten characters from the document image, wherein (a) in a case where a range of a tilt angle of the document image is determined to be equal to or larger than a prescribed value, the first image containing no handwritten characters is generated by determining pixels of handwritten characters using a first neural network and by eliminating the determined pixels of handwritten characters from the document image, (b) in a case where the range of the tilt angle of the document image is determined to be smaller than the prescribed value, the first image containing no handwritten characters is generated by determining the pixels of handwritten characters using a second neural network and by eliminating the determined pixels of handwritten characters from the document image, and (c) the second neural network is different from the first neural network;
   (3) estimating a tilt angle of the generated first image; and
   (4) tilt-correcting the document image on the basis of the estimated tilt angle of the generated first image,
   wherein the tilt-corrected document image includes the handwritten characters and the typed letters.

2. The image processing system according to claim 1, wherein a tilt of a document image used in learning in the second neural network is smaller than a tilt of a document image used in learning in the first neural network.

3. The image processing system according to claim 1, wherein the first neural network and the second neural network is are obtained by learning a plurality of images of handwritten characters having different tilt angles.

4. The image processing system according to claim 1, wherein the first neural network and the second neural network is are obtained by learning a plurality of document images having different tilt angles.

5. The image processing system according to claim 1, wherein a network structure of the second neural network is simpler than a network structure of the first neural network.

6. An image processing method for performing tilt correction with respect to a document image, the image processing method comprising:
- obtaining the document image, wherein the document image includes handwritten characters and typed letters;
- generating a first image containing no handwritten characters from the document image, wherein (a) in a case where a range of a tilt angle of the document image is determined to be equal to or larger than a prescribed value, the first image containing no handwritten characters is generated by determining pixels of handwritten characters using a first neural network and by eliminating the determined pixels of handwritten characters from the document image, (b) in a case where the range of the tilt angle of the document image is determined to be smaller than the prescribed value, the first image containing no handwritten characters is generated by determining the pixels of handwritten characters using a second neural network and by eliminating the determined pixels of handwritten characters from the document image, and (c) the second neural network is different from the first neural network;
- estimating a tilt angle of the generated first image; and
- tilt-correcting the document image on the basis of the estimated tilt angle of the generated first image,
- wherein the tilt-corrected document image includes the handwritten characters and the typed letters.

7. A non-transitory computer-readable storage medium storing a program causing a computer to execute a method comprising:
- obtaining a document image, wherein the document image includes handwritten characters and typed letters;
- generating a first image containing no handwritten characters from the document image, wherein (a) in a case where a range of a tilt angle of the document image is determined to be equal to or larger than a prescribed value, the first image containing no handwritten characters is generated by determining pixels of handwritten characters using a first neural network and by eliminating the determined pixels of handwritten characters from the document image, (b) in a case where the range of the tilt angle of the document image is determined to be smaller than the prescribed value, the first image containing no handwritten characters is generated by determining the pixels of handwritten characters using a second neural network and by eliminating the determined pixels of handwritten characters from the document image, and (c) the second neural network is different from the first neural network;
- estimating a tilt angle of the generated first image; and
- tilt-correcting the document image on the basis of the estimated tilt angle of the generated first image,
- wherein the tilt-corrected document image includes the handwritten characters and the typed letters.

* * * * *